July 25, 1961   W. E. ALTMANN   2,993,579
SYNCHRONIZATION ARRANGEMENT
Filed March 23, 1959   2 Sheets-Sheet 1
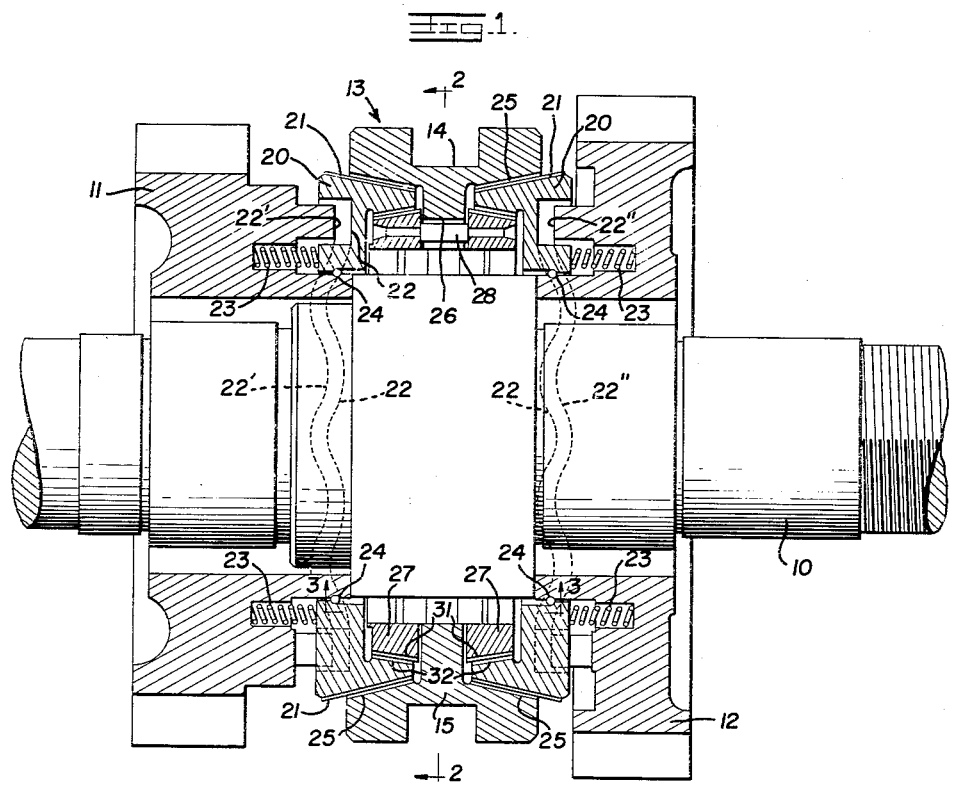
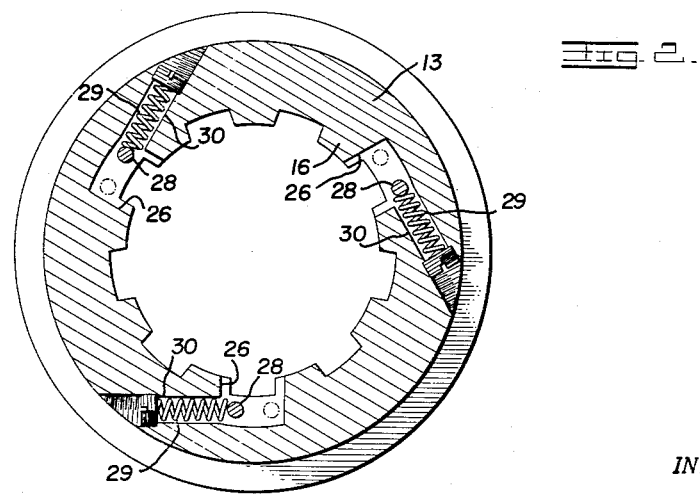
INVENTOR.
WERNER E. ALTMANN
BY
Dicke, Craig and Freudenberg
ATTORNEYS July 25, 1961 W. E. ALTMANN 2,993,579
SYNCHRONIZATION ARRANGEMENT
Filed March 23, 1959 2 Sheets-Sheet 2
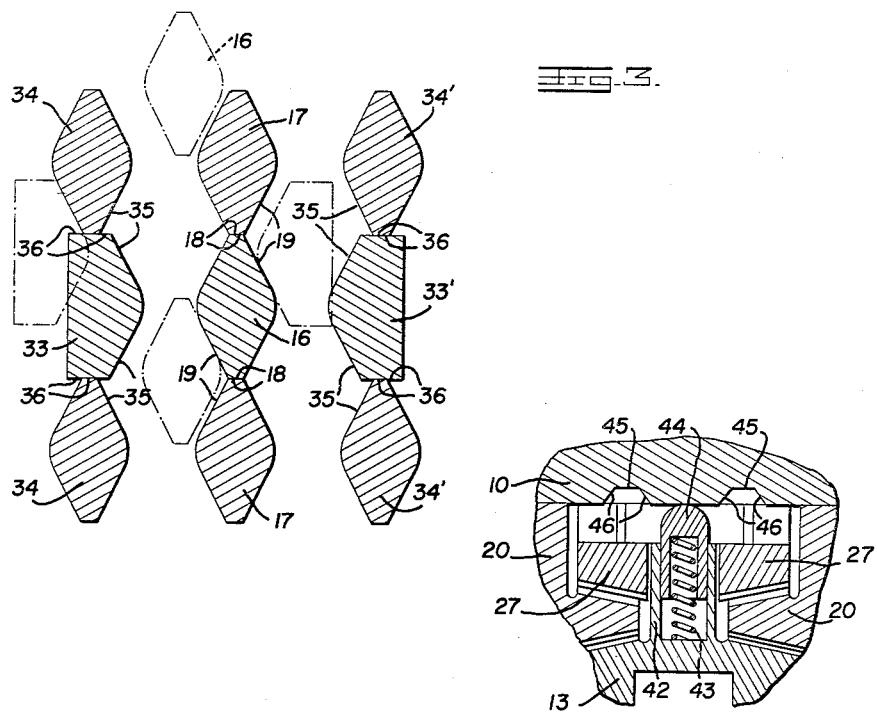
Fig. 3.
Fig. 5.
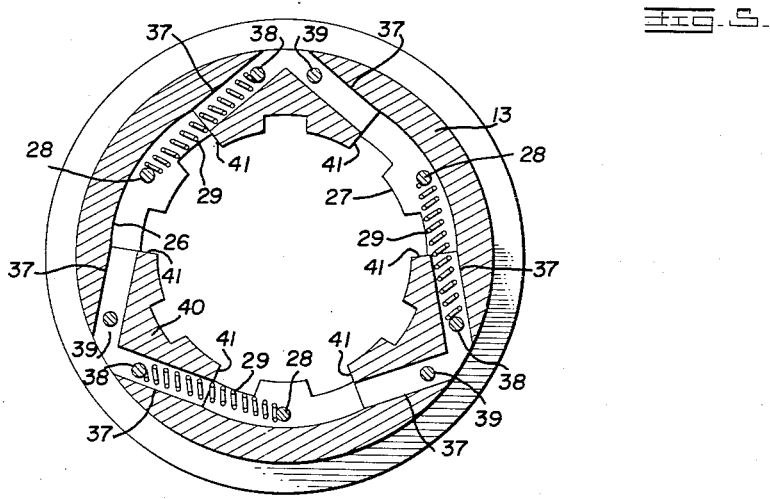
Fig. 4.
INVENTOR.
WERNER E. ALTMANN
BY
Dicke, Craig and Freudenberg
ATTORNEYS

2,993,579
SYNCHRONIZATION ARRANGEMENT
Werner E. Altmann, Stuttgart, Germany, assignor to Daimler-Benz Aktiengesellschaft, Stuttgart, Germany
Filed Mar. 23, 1959, Ser. No. 801,016
Claims priority, application Germany Mar. 28, 1958
19 Claims. (Cl. 192—114)

The present invention relates to a synchronization arrangement for change-speed transmissions of motor vehicles provided with gear wheels freely rotatably supported on a shaft and adapted to be operatively connected therewith by appropriate engageable means, such as friction clutches, and more particularly relates to a synchronization arrangement for motor-vehicle change-speed transmissions of the type more fully described in my copending application Serial No. 708,412, filed January 13, 1958, now Patent No. 2,942,712, granted June 28, 1960, and entitled, "Selectively Engageable Change Speed Transmissions," the subject matter of which is incorporated herein by reference.

In a construction and arrangement of the type mentioned hereinabove, a hub part which is adapted to be displaced in the axial direction thereof for purposes of providing a clutch engagement for the gear wheel or wheels, is operatively connected with the shaft by means of cam members arranged radially in a star-like manner along the respective peripheries and provided with surfaces that are parallel to the axis and inclined with respect thereto, whereby the hub part cooperates at the gear wheel with a synchronizing ring closed upon itself, i.e., which is endless, and which itself is adapted to be moved axially out of a blocking or locking position into a release or engaging position against the effect of the locking surfaces evenly distributed over the end face thereof.

The construction disclosed in the aforementioned copending application is still further improved in accordance with the present invention in that for each gear wheel that is to be clutchingly engaged, a counter-ring is arranged at the hub part cooperating with the synchronizing ring over conical friction surfaces, this counter-ring being operatively connected with a shaft over cam members arranged radially in a star-like manner and provided with surfaces parallel to the axis and inclined with respect thereto and which is adapted to be spread apart or rotated in the circumferential direction thereof with respect to the hub part by an appropriate spring effect so that the cam members of the hub part and those of the counter-ring abut in different directions of rotation against the cam members distributed along the circumference of the shaft.

The present invention offers the advantage that the tangential play in the connection between the hub part and the shaft is eliminated. As a result thereof, in case of change in the direction of power flow, the occurrence of any movement for purposes of changing the abutment surfaces or any noises accompanying the same is effectively rendered impossible. Furthermore, when passing through zero torque, the engaged speed or transmission ratio that had been previously engaged can no longer be forcibly disengaged by the spring acting axially on the synchronizing ring.

In accordance with one embodiment of the present invention, the counter-ring is arranged radially within the conical surfaces at the hub part and at the synchronizing ring. The counter-ring thereby engages with a plurality of projections thereof or the like in recesses or cut-out portions provided in the hub part whereby these projections are pre-loaded by springs which themselves are arranged, possibly adjustably, within the hub part and which springs produce, when released or expanded, the aforementioned spring effect.

The present invention may be applied in a particularly appropriate manner to motor-vehicle change-speed transmissions with so-called changing or shifting clutches for purposes of selectively engaging or clutching two gear wheels with the respective shaft thereof. In that case, a central annular portion forming the cam members is arranged at the hub part whereas two interchangeably similar counter-rings are arranged on both sides of this central portion in a mirror-image-like manner with respect to each other. The hub part is thereby provided at the annular portion thereof with several apertures or cut-out portions, for example, three in number in a tooth-gap-like manner while the counter-rings arranged on both sides of this central annular portion are connected with each other by pins or the like which extend through the apertures in the central annular portion.

The series of cam members provided on the shaft for engagement with the hub part and the counter-rings are arranged in such a manner that three cam members each are disposed adjacent one another in a plane parallel to the axis of the arrangement. Consequently, in neutral position, the cam members at the hub part and at the counter-rings come to lie within the gaps of the cam members of the shaft and are therefore also disposed parallel to each other in the axial direction whereby, however, the connecting pins or the like connecting the counter-rings are in that end position in which the springs present in the hub part are loaded or stressed.

Accordingly, it is an object of the present invention to provide a synchronizing arrangement for motor-vehicle change-speed transmissions which improves the operating characteristics thereof particularly as regards elimination of tangential play of certain parts and noises caused thereby.

It is another object of the present invention to provide a synchronization arrangement for a change-speed-gear which renders the same essentially insensitive to changes in the direction of power flow or reversals of torque transmission.

A further object of the present invention resides in the provision of a synchronization arrangement for motor-vehicle change-speed transmissions which improves the reliability in operation thereof and which prevents the unintentional inadvertent disengagement of the previously engaged speed, particularly when the torque transmitted by the transmission passes through zero.

These and other objects, features and advantages of the present invention will become more obvious from the following description when taken in connection with the accompanying drawing which shows, for purposes of illustration only, several embodiments in accordance with the present invention, and wherein:

FIGURE 1 is an axial cross sectional view through a synchronizing arrangement in accordance with the present invention for the shifting clutch of a motor-vehicle change-speed transmission;

FIGURE 2 is a transverse cross sectional view through FIGURE 1 taken along line 2—2;

FIGURE 3 is a cross sectional view, unrolled or unfolded into a single plane, of the normally circumferential arrangement of the cam members between the shaft, hub part and counter-rings respectively;

FIGURE 4 is a transverse cross sectional view, similar to FIGURE 2, of a modified embodiment of the hub part construction in accordance with the present invention, and FIGURE 5 is a partial cross sectional view of still a further modified embodiment of the hub part construction in accordance with the present invention.

Referring now to the drawing wherein like reference numerals are used throughout the various views thereof to designate like parts, and more particularly to FIGURES 1–3 thereof, reference numeral 10 designates therein a shaft on which two gear wheels 11 and 12 are supported by appropriate bearings so as to be freely rotatable thereon. The gear wheels 11 and 12 are in constant meshing engagement with further gears (not shown) which in turn are each mounted on a countershaft as is well known in the art. An axially displaceable hub part generally designated by reference numeral 13 is disposed between the gear wheels 11 and 12 which is provided with an annular groove 14 for purposes of engagement with a shifting member, for example, with a shifting fork (not shown). The hub part 13 is provided with a central annular portion 15 which forms along the inner periphery thereof cam member 16 (FIGURES 2 and 3) for purposes of engagement with the cam members 17 arranged radially in a star-like manner at the shaft 10 (FIGURE 3). The cam members 16 and 17 are provided, as described more fully in the aforementioned patent application, with surfaces 18 extending parallel to the axis for the neutral position thereof and with inclined surfaces 19 for the engaging position thereof.

The entire construction is symmetrical, and one synchronizing ring 20 each is arranged at each gear wheel 11 and 12. Each synchronizing ring 20 is constructed according to the teachings of the aforementioned copending application as a ring member fully closed upon itself, i.e., of endless construction, and provided with an engaging surface 21 (FIGURE 1) of conically truncated shape. Each synchronizing ring 20 is also supported for limited rotation with respect to gear wheel 11 or 12 respectively by means of sinusoidally shaped blocking or locking surfaces 22 evenly distributed along the circumference of the end face adjacent, i.e., facing complementary sinusoidally shaped blocking surfaces 22′ and 22″ of the respective gear wheel and is urged continuously by means of several springs 23 in the direction toward the hub part 13. A snap ring 24 or the like thereby limits the maximum axial movement of each synchronizing ring 20 to such a value as is smaller than the maximum lift or peak of the sinusoidally-shaped locking surfaces. The limitation in the axial direction, however, may also be achieved in any other suitable manner, for example, by the cam members themselves. A conically truncated surface 25 is provided at the hub part 13 for cooperation with the conical surface 21 of the synchronizing ring 20.

When the hub part 13 is moved, for example to the left, its friction surface 25 and the surface 21 on the synchronizing ring 20 will cause the latter to rotate, and, in the absence of synchronism between the hub part 13 and the gear wheel 11, the synchronizing ring will rotate with respect to gear wheel 11 until the relatively high points of the surfaces 22 and 22′ just below the peaks abut each other. This abutment limits the angular movement of these surfaces relative to each other and is occasioned by the position of the snap ring 24. Due to the abutment of the high points of the surfaces 22 and 22′ only slight axial movement of the synchronizing ring 20 is essentially permitted and the movement is insufficient to permit the parallel surfaces 18 seen in FIGURE 3 to come out of engagement with each other. However, when synchronism between hub part 13 and the gear wheel 11 is attained, an axial shifting force applied to hub part 13 may cause the surfaces 22 and 22′ to mutually interact whereby they will seek respective positions in which the high point of one surface is opposite the low point of the other surface, and vice versa, whereby the synchronizing ring 20 is permitted to move further toward gear wheel 11 to such an extent that the parallel surfaces 18 of FIGURE 3 are separated and the cam members 16, 33 and 33′ are moved axially to positions corresponding to the dot and dash line positions of FIGURE 3 wherein the inclined surfaces 19 and/or 35 act to provide a greater force-locking effect of the members interconnecting the shaft and the gear wheel 11. By similar operation of the hub part 13 to the right, the shaft may be force-lockingly interconnected to the gear wheel 12. The operation of the synchronizing ring 20 and of the sinusoidally-shaped locking surfaces 22, 22′ and 22″ has been described in detail in the aforementioned copending application so that a more detailed description thereof is dispensed with herein. Several cut-out portions or apertures 26 (FIGURE 2) for instance, three in number, are provided in the annular portion 15 of the hub part 13. One counter-ring 27 (FIGURE 1) each is provided on each side of the annular portion 15. Both counter-rings 27 are identical and are arranged mirror-image-like. The counter-rings 27 are fully closed upon themselves, i.e., are of endless construction in the circumferential direction, and are both rigidly connected with each other by means of pins 28 or the like (FIGURES 1 and 2). The pins 28 extend through apertures or cut-out portions 26 as may be readily seen from FIGURES 1 and 2. The pins 28 are thereby under the influence of springs 29 (FIGURE 2) which are adjustably accommodated within bores 30 provided in the annular portion 15. As a result of the spring-action caused by springs 29, the counter-rings 27 have a tendency to rotate relative to the annular portion 15.

The counter-rings 27 are disposed radially within the conical surfaces 21 and 25, and are provided along the outside thereof with conical surfaces 31 that cooperate with the conical surfaces 32 at the synchronizing ring 20. Both counter-rings 27 have only a relatively slight play with respect to the annular portion 15 by reason of a corresponding dimensioning of pins 28.

As shown in FIGURE 3, the counter-rings 27 engage by means of cam members 33 and 33′ in the gaps between the cam members 34 and 34′ respectively arranged radially at shaft 10 in a star-like manner. The cam members 33, 34, 33′ and 34′ are provided with surfaces 36 extending parallel to the axis for the neutral position and with inclined surfaces 35 for the engaging position.

Accordingly, three rows of cam members are provided at shaft 10 whereby each is disposed in a plane extending perpendicularly to the shaft axis and whereby each individual cam member extends radially outwardly from shaft 10. These three rows of cam members are so arranged that three cam members 34, 17, 34′ each are arranged adjacent one another in a direction parallel to the shaft axis. All of the cam members on shaft 10 are constructed in an identical manner. Moreover, these cam members 34, 17, 34′ on shaft 10 as well as the other cam members of the synchronization arrangement in accordance with the present invention may be provided with two inclined surfaces corresponding to the locking position and the engaging position respectively in the place of the single inclined surface shown herein for purposes more fully disclosed in the aforementioned copending patent application. The axial distance of the rows of cam members 34 and 34′ on shaft 10 from cams 17 is larger than the distance of the outer cam members 33 and 33′ of the counter-rings 27 from the center row of cam members 16 of hub part 13, i.e., the rows of cams 34, 17 and 34′ on the shaft have a larger axial distance with respect to each other than the row of cams 16 has from the respective rows of cams 33 and 33′ on the counter-rings.

In the position of the cam members illustrated in full line in FIGURE 3 corresponding to neutral position, the cam members 33 and 33′ of the counter-rings 27 and the cam members 16 of the hub part 13 come to lie adjacent one another in planes parallel to the axis, and more particularly, in the gaps of cam members 34, 17, 34′ at shaft 10. The cam members 16, 17, 33, 33′, 34, 34′ thereby abut against one another with the surfaces 18 and 36 thereof extending parallel to the axis. In this position the springs 29 are stressed.

If the hub part 13 is now moved, for purposes of engaging a speed, for example, toward the left in the direction toward the gear wheel 11, then the synchronizing ring 20, at first, becomes operative by engagement of the conical surfaces 21 and 25. If no synchronism exists the frictional engagement at surfaces 21, 25 tends to move the synchronizing ring 20 relative to gear wheel 11 whereby the sinusoidally shaped locking surfaces 22 on synchronizing ring 20 are moved relative the complementary locking surfaces 22' provided on the end face of gear 11. As a result thereof approximately the peaks of locking surfaces 22 and 22' come to be opposite one another so that the further axial movement of hub part 13 is thereby effectively blocked until synchronism exists between shaft 10 and therewith hub 13 and synchronizing ring 20, on the one hand, and gear wheel 11, on the other. Since these steps in the operation of this type of synchronization arrangement are more fully described in the aforementioned copending application, a more detailed description is dispensed with herein.

As soon as synchronism exists, the locking surfaces 22 and 22' will permit relative angular movement of the synchronizing ring with respect to gear wheel 11 so that the peak portions of one locking surface come to lie more nearly opposite the trough portions of the other locking surface and vice versa whereby further movement of synchronizing ring 20 toward the left is again permitted. Consequently, upon attaining synchronism, the left synchronizing ring 20 moves out of the locking position thereof back toward the left into the release position whereby the cam members 33, 16 and 33' leave the gaps formed between the shaft cam members 34, 17 and 34'. The cam members 16 thereby abut against cam members 17 of shaft 10 in the position shown in FIGURE 3 in dot-and-dash lines.

In contrast thereto, the counter-rings 27 are now rotated by springs 29 relative hub part 13 in such a manner that the cam members 33 and 33' abut in the opposite direction of rotation, so to speak, with the inclined surfaces 35 thereof against the inclined surfaces 35 of cam members 34 and 34', as also illustrated in dot-and-dash lines in FIGURE 3. Simultaneously therewith, in addition to the conical surfaces 21 and 25 between synchronizing ring 20 and hub part 13, the conical surfaces 31 and 32 at the synchronizing ring 20 and counter-ring 27 are pressed against each other in a force-locking manner. Consequently, no tangential play exists any longer in the operative connection between hub part 13 and shaft 10.

If the engine drives the vehicle, i.e., supplies the driving torque, then the force-transmission takes place from gear wheel 11 over synchronizing ring 20, the conical surfaces 21 and 25, to the hub part 13 and from the cam members 16 of hub part 13 over the inclined surfaces 19 to the cam members 17 at shaft 10. If now, for example, the driver's foot is lifted off the gas pedal (not shown) so that there occurs a reversal in the direction of power flow and the vehicle begins to drive the engine, then the force-transmission takes place over the cam members 34 of shaft 10 with the inclined surfaces 35 thereof to the cam members 33 of the counter-ring 27 and from these over the conical surfaces 31, 32 to the synchronizing ring 20 and therewith to the gear wheel 11. Consequently, during change-over in the direction of force-transmission no movement occurs in the connection between shaft 10 and hub part 13 so that any banging, impact or abutment noises are effectively eliminated thereby.

In the embodiment according to FIGURE 4, three cut-out portions or apertures 26 are again provided in hub parts 13. However, these cut-out portions or apertures 26 are made of such a size that the remaining segments 40 out of which cam members 16 are formed, are of the same size as cut-out portions or apertures 26. Tangential bores 37 lead outwardly from both end surfaces 41 of the cut-out portions or apertures 26. Bores 37 serve to accommodate therein, again possibly in an adjustable manner, springs 29 which are anchored at the outer ends thereof on pins 38. Bores 39 are provided in hub part 13 to receive therein pins 38. The springs 29 push or press against pins 28 secured within counter-ring 27 or are operatively secured with the counter-rings 27 in any other suitable manner. The hub part 13 of FIGURE 4, by reason of the provision of bores 37 in both directions of rotation, may also be used for both directions of rotation. Three bores 37 each are, therefore, equipped with springs 29 whereas the other three bores 37 are left empty.

The springs 29 are so matched to springs 23 that the speed cannot inadvertently jump out of the pre-existing engaged position thereof even with the occurrence of zero torque. This is so because for that purpose cam members 33 would have to slide back along inclined surfaces 35 into the gaps between cam members 34 which is prevented by springs 29.

FIGURE 5 illustrates a hub portion 13 which, in principle, is constructed like the hub portion of the other embodiments. However, it is provided with several radial bores 42, for example, three in number, in which are arranged detent bolts 43 provided with ball-shaped ends 44. The bores 42 may be provided in structures such as the cam members 16 of FIGURES 1 and 3 or radially projecting members accommodating the bolts 43 may be substituted in place of three of the cam members 16 which are arranged in a ring. Two grooves 45 with inclined surfaces 46 are provided along the periphery of shaft 10. In the engaged position, the detent bolt 43 with the ball-shaped end 44 rests against one of the two inclined surfaces and thereby retains the hub portion 13 in the engaged position. The detent bolt arrangement 43, 44 also forms a safety feature against any unintended jumping-out of the engaged speed, even if during change-over in torque no sufficient axial thrust is produced by cam members 16, 17 between hub portion 13 and shaft 10.

The cam members at the shaft 10, at hub portion 13, at synchronizing ring 20 and at counter-ring 27 may be made in any suitable manner, for example, milled out of the stock by suitable milling machines or may be formed as pin members suitably secured to the respective part in any known manner.

While I have shown and described several specific embodiments in accordance with the present invention, it is understood that the same is not limited thereto but is susceptible of many changes and modifications within the spirit and scope of the present invention, and I, therefore, do not wish to be limited to the specific embodiments shown and described herein but intend to cover all those changes and modifications thereof as are encompassed by the scope of the appended claims.

I claim:

1. A synchronization arrangement for a change-speed transmission comprising a shaft, at least one gear wheel freely rotatable on said shaft, and engaging means for selectively and operatively connecting said gear wheel with said shaft including a hub part, synchronizing ring means, first cam means intermediate said shaft and said hub part effectively providing first surface portions essentially parallel to the axis of said shaft and second surface portions inclined with respect to said axis for operatively connecting said shaft with said hub part, complementary locking surface means on mutually facing ends of said synchronizing ring means and of said gear wheel to effectively prevent complete engagement between said shaft and said gear wheel until essentially complete synchronism exists therebetween, counter-ring means for said gear wheel at said hub part, complementary friction surface means at said hub part, said synchronizing ring means and said counter-ring means to provide frictional engagement therebetween, second cam means intermediate said shaft and said counter-ring means effectively providing first surface portions parallel to the axis of said shaft and second surface portions inclined with respect thereto for operatively connecting said counter-ring means with said shaft, and spring means tending to rotate said counter-ring means to thereby provide abutment of the cam means of said hub part and of said counter-ring means in different directions of rotation against the cam means of said shaft.

2. A synchronization arrangement for a change-speed transmission according to claim 1, wherein said counter-ring means is disposed radially inwardly of said complementary friction surface means at said hub part and at said synchronizing ring means.

3. A synchronization arrangement for a change-speed transmission according to claim 1, wherein said counter-ring means is provided with several projections, wherein said hub part is provided with several cut-out portions for accommodating therein said projections, and wherein said spring means are operative to effectively spring-load said projections relative to said hub part.

4. A synchronization arrangement for a change-speed transmission according to claim 3, wherein said spring means are adjustably arranged within said hub part.

5. A synchronization arrangement for a change-speed transmission according to claim 4, wherein said cut-out portions have a larger angular extent than corresponds to the two end positions of said projections as determined by the relative rotational movement of said cam means with respect to said counter-ring means whereby the boundaries of said cut-out portions do not limit said relative rotational movement.

6. A synchronization arrangement for a change-speed transmission comprising a shaft, two gear wheels freely rotatable on said shaft, and engaging means for selectively and operatively connecting a respective one of said gear wheels with said shaft including a hub part provided with a central annular portion, synchronizing ring means, first cam means intermediate said shaft and said hub part effectively providing first surface portions essentially parallel to the axis of said shaft and second surface portions inclined with respect to said axis for operatively connecting said shaft with said hub part some of said first cam means being constituted by said annular portion, complementary locking surface means on mutually facing ends of said synchronizing ring means and of said gear wheels to effectively prevent complete engagement between said shaft and a respective one of said gear wheels until essentially complete synchronism exists therebetween, counter-ring means for said gear wheels arranged on either side of said hub part, complementary friction surface means at said hub part, said synchronizing ring means and said counter-ring means to provide frictional engagement therebetween, second cam means intermediate said shaft and said counter-ring means effectively providing first surface portions parallel to the axis of said shaft and second surface portions inclined with respect thereto for operatively connecting said counter-ring means with said shaft, and spring means tending to rotate said counter-ring means to thereby provide abutment of the cam means of said hub portion and of said counter-ring means in different directions of rotation against the cam means of said shaft.

7. A synchronization arrangement for a change-speed transmission according to claim 6, wherein said annular portion is provided with three tooth-gap-like cut-out portions, and further comprising pin means extending through said cut-out portions and operatively connecting with each other the counter-ring means disposed on both sides of said annular portion.

8. A synchronization arrangement for a change-speed transmission according to claim 6, wherein said cam means on said shaft are so arranged that three cams each are always disposed in one plane parallel to the axis of said shaft.

9. A synchronization arrangement for a change-speed transmission according to claim 8, wherein, in the neutral position, the cam means arranged at said hub part and the cam means arranged at said counter-rings are disposed axially parallel in the gaps of the cam means of said shaft, and wherein said pin means are with respect to said cut-out portions in that end position thereof in which said spring means are most stressed.

10. A synchronization arrangement for a change-speed transmission comprising a shaft, two gear wheels freely rotatable on said shaft, and engaging means for selectively and operatively connecting one of said gear wheels with said shaft including a hub part, synchronizing ring means, first cam means including one row of cam members each on said shaft and said hub part for operatively connecting said shaft with said hub part, each cam member effectively providing first surface portions essentially parallel to the axis of said shaft and second surface portions inclined with respect to said axis, complementary locking surface means on mutually facing ends of said synchronizing ring means and of said gear wheels to effectively prevent complete engagement between said shaft and a respective one of said gear wheels until essentially complete synchronism exists therebetween, counter-ring means for said gear wheel at said hub part, complementary conical friction surface means at said hub part, said synchronizing ring means and said counter-ring means to provide frictional engagement therebetween, second cam means including one row of cam members at each of said counter-ring means and one row of cam members at said hub part for each row of cam members, at said synchronizing ring means for operatively connecting said counter-ring means with said shaft, each cam member effectively providing first surface portions parallel to the axis of said shaft and second surface portions inclined with respect thereto, and spring means tending to rotate said counter-ring means to thereby provide abutment of the cam means of said hub portion and of said counter-ring means in different directions of rotation against the cam means of said shaft.

11. A synchronization arrangement for a change-speed transmission according to claim 10, wherein the cam rows on said shaft have a larger axial distance from each other than the cam row at said hub part with respect to those at said counter-rings.

12. A synchronization arrangement for a change-speed transmission according to claim 6, wherein said hub part is provided with cut-out portions intermediate segments of said annular portion, further comprising pin means operatively connecting said two counter-ring means, said pin means being accommodated within said cut-out portions, and wherein the segments of said annular portion are identically large among each other and evenly distributed over the circumference thereof.

13. A synchronization arrangement for a change-speed transmission according to claim 1, wherein said hub part is provided with cut-out portions, and bore means extending from the end surfaces of said cut-out portions for accommodating therein said spring means.

14. A synchronization arrangement for a change-speed transmission according to claim 13, wherein said bore means extend essentially tangentially from each end surface of said cut-out portion to thereby permit utilization of said synchronization arrangement in both directions of rotation.

15. A synchronization arrangement for a change-speed transmission according to claim 1, wherein at least one detent means is arranged within said hub part, and wherein said shaft is provided with inclined surfaces against which said detent means abuts in the engaged position of said synchronization arrangement.

16. A synchronization arrangement for a change-speed transmission comprising a shaft, at least one gear wheel freely rotatable on said shaft, and engaging means including a hub part and synchronizing ring means for selectively and operatively connecting said gear wheel with said shaft, radial cam means provided with surface means having surface portions parallel to the axis of said shaft and surface portions inclined with respect to said axis for operatively connecting said shaft with said hub part, complementary evenly distributed locking surface means provided at mutually facing ends of said synchronizing ring means and of said gear wheel, counter-ring means for each gear wheel to be selectively connected to said shaft arranged at said hub part, complementary conical surface means at said synchronizing ring means and at said counter-ring means to provide frictional engagement therebetween, radial cam means provided with surface means having surface portions parallel to the axis of said shaft and surface portions inclined with respect thereto for operatively connecting said counter-ring means with said shaft, and spring means for effectively spreading said counter-ring means in the release position thereof to thereby provide abutment of the cam means of said hub portion and of said counter-ring means in different directions of rotation against the cam means of said shaft.

17. In an arrangement for shifting a change-speed transmission adapted to be shifted in a step-like manner and provided with at least one pair of gears in continuous meshing engagement with one another, shaft means, one of said pair of gears being rotatably mounted on said shaft means, a force-locking shifting clutch arrangement comprising an axially displaceable hub part operatively connected with said shaft means for selectively engaging the latter with said rotatably mounted gear, synchronizing ring means between said hub part and said rotatable gear, said synchronizing ring means being supported at one of the two parts consisting of said hub part and said rotatable gear, said synchronizing ring means and the other part being provided with inclined engaging surfaces to enable complete force-locking engagement therebetween, means between said synchronizing ring means and said one part to effect blocking of said synchronizing ring means during the occurrence of a friction moment at said engaging surfaces to thereby enable only a limited frictional engagement and prevent complete force-locking engagement thereat between said hub part and said one rotatable gear until synchronism exists therebetween, counter-ring means between said shaft and said synchronizing ring means including inclined engaging surfaces between said counter-ring means and one of the two parts consisting of said synchronizing ring means and said shaft means, and means intermediate said counter-ring means and the other of said two last-mentioned parts to effectively eliminate tangential play between said axially displaceable hub part and said shaft in the engaged position of said clutch arrangement.

18. In an arrangement for shifting a change-speed transmission adapted to be shifted in a step-like manner and provided with at least one pair of gears in continuous meshing engagement with one another, shaft means, one of said pair of gears being rotatably mounted on said shaft means, a force-locking shifting clutch arrangement comprising an axially displaceable hub portion operatively connected with said shaft means for selectively engaging the latter with said rotatably mounted gear, synchronizing ring means between said hub portion and said rotatable gear, engaging surfaces at said synchronizing ring means and said hub portion to enable complete force-locking engagement therebetween, means between said synchronizing ring means and said one gear to effect blocking of said synchronizing ring means during the occurrence of a friction moment at said engaging surfaces to thereby enable only a limited frictional engagement and prevent complete force-locking engagement thereat between said hub portion and said one rotatable gear until synchronism exists therebetween, counter-ring means between said shaft and said synchronizing ring means including inclined engaging surfaces between said counter-ring means and one of the two parts consisting of said synchronizing ring means and said shaft means, and means intermediate said counter-ring means and the other of said two last-mentioned parts to effectively eliminate tangential play between said axially displaceable hub portion and said shaft.

19. A synchronization arrangement for a change-speed transmission according to claim 6, wherein said counter-ring means are of identical construction and are arranged in a mirror-image-like manner with respect to said annular portion.

References Cited in the file of this patent

UNITED STATES PATENTS

| | | |
|---|---|---|
| 2,874,817 | Altmann | Feb. 24, 1959 |

FOREIGN PATENTS

| | | |
|---|---|---|
| 520,610 | Italy | Mar. 23, 1955 |
| 1,025,734 | Germany | Mar. 6, 1958 |